United States Patent
Lee (10) Patent No.: US 10,516,818 B2
(45) Date of Patent: Dec. 24, 2019

(54) PHOTOGRAPHING APPARATUS AND OPERATING METHOD THEREOF

(71) Applicant: SK Planet Co., Ltd., Seongnam-si, Gyeonggi-do (KR)

(72) Inventor: Gi Dong Lee, Seoul (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 0 days.

(21) Appl. No.: 15/826,513

(22) Filed: Nov. 29, 2017

(65) Prior Publication Data
US 2019/0215436 A1    Jul. 11, 2019

(30) Foreign Application Priority Data
Dec. 22, 2016 (KR) .......... 10-2016-0176788

(51) Int. Cl.
*H04N 5/232* (2006.01)
*H04N 5/235* (2006.01)

(52) U.S. Cl.
CPC ....... *H04N 5/23206* (2013.01); *H04N 5/2353* (2013.01); *H04N 5/23212* (2013.01); *H04N 5/23254* (2013.01)

(58) Field of Classification Search
None
See application file for complete search history.

(56) References Cited

U.S. PATENT DOCUMENTS

| | | | |
|---|---|---|---|
| 5,465,144 A * | 11/1995 | Parker ............... | B25J 9/1697 250/206.1 |
| 7,317,872 B1 * | 1/2008 | Posa .................. | G02B 7/40 367/107 |
| 2010/0311347 A1 * | 12/2010 | Le Thierry D'Ennequin ........ | H04N 1/32106 455/67.11 |
| 2012/0120266 A1 * | 5/2012 | Kang ................. | H04N 5/23212 348/211.2 |
| 2012/0249802 A1 * | 10/2012 | Taylor ............... | G06K 9/00771 348/169 |
| 2016/0124288 A1 * | 5/2016 | Yang ................. | G03B 13/36 348/348 |

* cited by examiner

*Primary Examiner* — James M Hannett
(74) *Attorney, Agent, or Firm* — Fenwick & West LLP (57) ABSTRACT

A photographic apparatus that includes a processor and a memory storing one or more commands that, when executed by the processor, cause the processor to perform operations, the operations including: obtaining a communication signal from a subject; identifying photographing reference information from the communication signal; and based on the photographing reference information, controlling at least one of a focus value and a shutter speed to capture a photo that includes the subject is disclosed.

17 Claims, 7 Drawing Sheets

PHOTOGRAPHING APPARATUS AND OPERATING METHOD THEREOF

CROSS-REFERENCE TO RELATED APPLICATIONS

This application is based on and claims priority to Korean Patent Application No. 10-2016-0176788, filed on Dec. 22, 2016. The entire disclosure of which is incorporated here by reference.

TECHNICAL FIELD

The present specification relates image capturing and more specifically to a method for processing photographing of a subject based on at least one of a focus value and a shutter speed.

BACKGROUND

As a digital camera converts an analog image to a digital image for use, the digital camera has functions of stabilizing an image signal, electronic zooming and automatic adjustment, which are difficult to realize in a conventional analog environment. Further, due to advancement in low-power technology for circuits, digital cameras are getting smaller.

In recent years, digital cameras have often been produced and sold as separate types of products, while digital cameras have been increasingly attached to mobile terminals, such as mobile phones, PDAs, and notebooks.

A digital camera installed in a mobile terminal includes, as a camera system, which is a critical part thereof, automatic adjustment devices for Automatic Focus (AF) adjustment, Automatic Exposure (AE) adjustment, and Automatic White Balance (AWB) adjustment to obtain an optimal image from an input image.

Although an AF adjustment function is an important function that directly affects image quality, in practice, an AF adjustment function achieved by a mobile terminal has inferior performance to an AF adjustment function of a digital camera released as a standalone product.

Accordingly, the present specification aims to propose a method for improving an AF adjustment function achieved by a mobile terminal.

SUMMARY

The present specification is related capturing images. In particular, the present specification describes an improved AF adjustment function that includes processing photographing of a subject according to at least one a focus value and a shutter speed determined based on a communication signal transmitted from the subject.

In general, one innovative aspect of the subject matter described in this specification can be embodied in a photographic apparatus that includes a processor and a memory storing one or more commands that, when executed by the processor, cause the processor to perform operations, the operations including: obtaining a communication signal from a subject; identifying photographing reference information from the communication signal; and based on the photographing reference information, controlling at least one of a focus value and a shutter speed to capture a photo that includes the subject.

The foregoing and other implementations can each optionally include one or more of the following features, alone or in combination. In particular, one implementation includes all the following features in combination. The photographing reference information includes at least one of (i) a distance between the photographing apparatus and the subject and (ii) a state of motion of the subject, wherein the distance is determined using a Received Signal Strength Indicator (RSSI) of the communication signal. The operations further include: receiving a first communication signal and a second communication signal from the subject; identifying a first RSSI from the first communication signal and a second RSSI from the second communication signal; determining a time period between a first moment that the first communication signal is received and a second moment that the second communication signal is received; and determining the state of motion based on the first RSSI, the second RSSI, and the time period. Determining the state of motion includes: determining a moving speed of the subject based on the first RSSI, the second RSSI, and the time period. The moving speed of the subject is proportional to a difference between a value of the first RSSI and a value of the second RSSI. The operations further include: processing advance photographing of the subject at an advance photographing time; obtaining a particular focus value that is used to process the advance photographing of the subject at the advance photographing time; and generating photographing criterion information that includes the particular focus value. The operations further include: identifying, from the photographing criterion information, the particular focus value; adjusting the particular focus value based on the distance of the photographing reference information; and processing the photographing of the subject based on the adjusted focus value.

In general, another innovative aspect of the subject matter described in this specification can be embodied in a method including: obtaining a communication signal from a subject; identifying photographing reference information from the communication signal; and based on the photographing reference information, controlling at least one of a focus value and a shutter speed to capture a photo that includes the subject.

The foregoing and other implementations can each optionally include one or more of the following features, alone or in combination. In particular, one implementation includes all the following features in combination. The photographing reference information comprises at least one of (i) a distance between the photographing apparatus and the subject and (ii) a state of motion of the subject, wherein the distance is determined using an RSSI of the communication signal. The method further includes: receiving a first communication signal and a second communication signal from the subject; identifying a first RSSI from the first communication signal and a second RSSI from the second communication signal; determining a time period between a first moment that the first communication signal is received and a second moment that the second communication signal is received; and determining the state of motion based on the first RSSI, the second RSSI, and the time period. Determining the state of motion includes: determining a moving speed of the subject based on the first RSSI, the second RSSI, and the time period. The moving speed of the subject is proportional to a difference between a value of the first RSSI and a value of the second RSSI. The method further includes: processing advance photographing of the subject at an advance photographing time; obtaining a particular focus value that is used to process the advance photographing of the subject at the advance photographing time; and generating photographing criterion information that includes the particular focus value. The method further includes: identifying, from the photographing criterion information, the particular focus value; adjusting the particular focus value based on the distance of the photographing reference information; and processing the photographing of the subject based on the adjusted focus value.

In general, another innovative aspect of the subject matter described in this specification can be embodied in one or more computer-readable storage media encoded with one or more commands that, when executed by the processor, cause the processor to perform operations, the operations including: obtaining a communication signal from a subject; identifying photographing reference information from the communication signal; and based on the photographing reference information, controlling at least one of a focus value and a shutter speed to capture a photo that includes the subject.

The foregoing and other implementations can each optionally include one or more of the following features, alone or in combination. In particular, one implementation includes all the following features in combination. The photographing reference information includes at least one of (i) a distance between the photographing apparatus and the subject and (ii) a state of motion of the subject, wherein the distance is determined using an RSSI of the communication signal. The operations further include: receiving a first communication signal and a second communication signal from the subject; identifying a first RSSI from the first communication signal and a second RSSI from the second communication signal; determining a time period between a first moment that the first communication signal is received and a second moment that the second communication signal is received; and determining the state of motion based on the first RSSI, the second RSSI, and the time period. Determining the state of motion includes: determining a moving speed of the subject based on the first RSSI, the second RSSI, and the time period, and wherein the moving speed of the subject is proportional to a difference between a value of the first RSSI and a value of the second RSSI. The operations further include: processing advance photographing of the subject at an advance photographing time; obtaining a particular focus value that is used to process the advance photographing of the subject at the advance photographing time; and generating photographing criterion information that includes the particular focus value. The operations further include: identifying, from the photographing criterion information, the particular focus value; adjusting the particular focus value based on the distance of the photographing reference information; and processing the photographing of the subject based on the adjusted focus value.

The subject matter described in this specification can be implemented in particular embodiments so as to realize one or more of the following advantages. Photographing of a subject may be processed according to a focus value and a shutter speed determined using a short-range communication signal transmitted from the subject, thereby improving an AF adjustment function.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

It should be noted that the technical terms as used herein are merely used for describing particular implementations, and are not intended to limit the scope of the present specification. Further, the technical terms in the specification should be construed as a meaning generally understood by those skilled in the art unless the terms are defined as another meaning and should not be construed as an excessively inclusive meaning or an excessively exclusive meaning. When a technical term used in the specification is an incorrect technical term which does not accurately express the idea of the present specification, the technical term should be replaced with the correct technical term which can be understood by those skilled in the art. Further, the general terms used in the present specification should be interpreted in the context according to the dictionary definition and should not be construed as possessing an excessively limited meaning.

In addition, a singular expression used in the specification includes a plural expression as long as they are clearly distinguished in the context. In the present specification, the term "comprise" or "include" should not be construed as necessarily including all of various elements or various steps disclosed herein, and it should be understood that some of the elements or steps may not be included, or additional elements or steps may be further included.

In addition, although terms including ordinal numbers such as first, second, and the like may be used to describe various elements, the elements should not be restricted by the terms. The terms are used merely for the purpose to distinguish an element from the other elements. For example, a first element may be termed a second element, and similarly, a second element may be termed a first element without departing from the scope of the present specification.

Particular implementations of the present specification will be described in detail with reference to the accompanying drawings, equal or similar elements are assigned an equal reference numeral, and an overlapping description thereof will be omitted.

Further, in the following description of the technology of the present specification, a detailed description of known technologies incorporated herein will be omitted when it may make the subject matter of the present specification rather unclear. Further, it should be noted that the accompanying drawings are intended only for the easy understanding of the technical idea of the present specification, and the technical idea should not be construed as being limited by the accompanying drawings.

Figure 1:
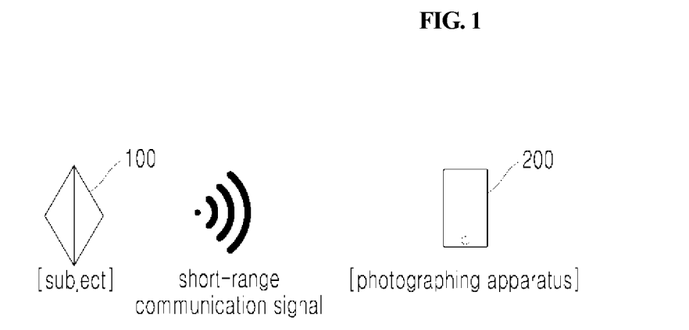
FIG. 1 illustrates an example schematic configuration of a photographing system.

FIG. 1 illustrates an example schematic configuration of photographing system. In FIG. 1, the example photographing system includes a subject 100 and a photographing apparatus 200 to photograph the subject 100.

The subject 100 refers to an object that is photographed through the photographing apparatus 200 and transmits a short-range communication signal at a particular time period.

In some implementations, the short-range communication signal refers to a signal periodically transmitted according to a short-range communication method such as Bluetooth Low Energy (BLE) and Wi-Fi.

In some implementations, the subject 100 may represent any suitable device that a user carries. For example, the subject 100 can include a smartphone, a portable terminal, a mobile terminal, a Personal Digital Assistant (PDA), a Portable Multimedia Player (PMP), a telematics terminal, a navigation terminal, a personal computer (PC), a notebook computer, a slate PC, a tablet PC, an Ultrabook, a wearable device e.g., a smartwatch, smart glasses, a head-mounted display (HIVID), or the like, a WiBro terminal, or a flexible terminal.

In some other implementations, the subject 100 may represent an object that is photographed. The subject 100 can include any suitable communication units to communicate with the photographing apparatus 200 or other devices.

In some implementations, the photographing apparatus 200 represents a mobile terminal including an on-board digital camera. For example, the photographing apparatus 200 can include a mobile phone, a smartphone, a tablet PC, a PDA, notebooks, and the like. However, the photographing apparatus 200 is not limited to these devices and can be any suitable device having a digital camera. The digital camera in the photographing apparatus 200 can stabilize an image signal, electronically zoom an object, and automatically post process an image. Furthermore, the digital camera can have a compact size. In some other implementations, the photographing apparatus 200 represents a separate digital camera rather than a digital camera incorporated into another device, e.g., a mobile phone.

A digital camera in the photographing apparatus 200 can automatically control focus, exposure, and white balance to obtain an optimal image.

Figure 2:
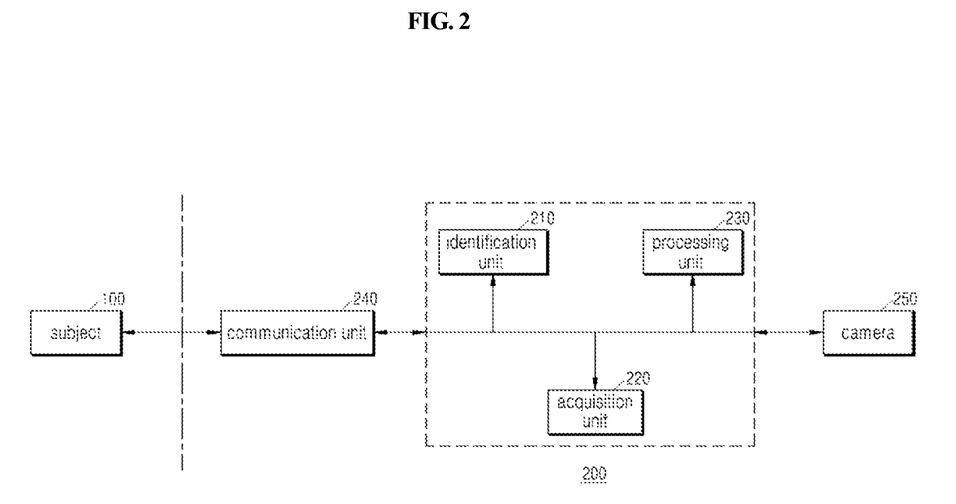
FIG. 2 illustrates an example schematic configuration of a photographing apparatus.

However, due to the characteristics of the mobile terminal, in which various hardware and software combinations are inevitably provided to achieve multiple purposes, in addition to the digital camera, the AF adjustment function supported by the photographing apparatus 200 has, in practice, performance inferior to that of an AF adjustment function of a digital camera released as a standalone product. Accordingly, implementations are described in this specification that can improve the performance of the AF adjustment function of the photographing apparatus 200, in which various hardware and software combinations are provided to achieve multiple purposes in addition to the digital camera. FIG. 2 illustrates an example schematic configuration of a photographing apparatus 200. As illustrated in FIG. 2, the photographing apparatus 200 includes an identification unit 210 to identify a short-range communication signal, an acquisition unit 220 to acquire photographing reference information, and a processing unit 230 to process photographing.

In some implementations, at least one component of the photographing apparatus 200 including the identification unit 210, the acquisition unit 220, and the processing unit 230 may be implemented as software. In some implementations, at least one component of the photographing apparatus 200 including the identification unit 210, the acquisition unit 220, and the processing unit 230 may be implemented as hardware. In some other implementations, at least one component of the photographing apparatus 200 including the identification unit 210, the acquisition unit 220, and the processing unit 230 may be implemented as a combination of software and hardware.

In this example, the photographing apparatus 200 includes a processor and a memory storing one or more commands that, when executed by the processor, cause the processor to perform various operations.

The photographing apparatus 200 may further include a communication unit 240 and a camera 250, in addition to the aforementioned components.

For example, the communication unit 240 and the camera 250 respectively correspond to a communication unit 1310 and a camera 1321, which will be described in greater detail with reference to FIG. 3.

The photographing apparatus 200 may process photographing of a subject 100 using a short-range communication signal transmitted from the subject 100 using the identification unit 210, the acquisition unit 220, and the processing unit 230. The identification unit 210 identifies a short-range communication signal. In particular, the identification unit 210 identifies a short-range communication signal transmitted from the subject 100 in each time period.

In this example, the identification unit 210 may distinguish a short-range communication signal transmitted from the subject 100 from other short-range communication signals received within a certain area using a method of identifying identification information, e.g., a Universal Unique Identifier, (UUID), included in the short-range communication signal.

The acquisition unit 220 obtains photographing reference information. In particular, when a short-range communication signal transmitted from the subject 100 is identified, the acquisition unit 220 acquires photographing reference information for photographing the subject 100 from the identified short-range communication signal. The acquired photographing reference information may include the distance to the subject 100, which is identified from the RSSI of the short-range communication signal, and a state of motion of the subject 100, which is identified from an RSSI difference between neighboring periods.

In this example, the state of motion of the subject 100 may include the moving speed of the subject 100. In some implementations, the moving speed of the subject 100 can be proportional to the RSSI difference between the neighboring periods. For example, the RSSI difference between the neighboring periods represents a positional change of the subject 100 that approaches or moves away from the photographing apparatus 200 receiving the short-range communication signal. Thus, the moving speed of the subject 100 can be determined based on the degree of the positional change.

The processing unit 230 processes photographing of the subject 100. In particular, when photographing reference information for photographing the subject 100 is acquired from a short-range communication signal, the processing unit 230 processes photographing of the subject 100. The processing unit 230 determines a focus value and a shutter speed based on the acquired photographing reference information. Then, the processing unit 230 operates the camera 260 to take a photo of the subject 100 using the focus value and the shutter speed.

In some implementations, the processing unit 230 may determine a focus value for the camera 260 based on the distance between the photographing apparatus 200 and the subject 100. The distance can be obtained from the photographing reference information. In addition, the processing unit 230 may determine a shutter speed for the camera 250 based on a moving speed of the subject 100. The moving speed of the subject can be obtained from the state of motion of the subject 100 in the photographing reference information.

A component of the photographing apparatus 200 can be implemented as software, hardware, or a combination of software and hardware. In some implementations, the photographing apparatus 200 can be implemented as part of a system, e.g., a computer system. In addition, various modifications can be made to the photographing apparatus 200 and the system including the photographing apparatus 200.

Figure 3:
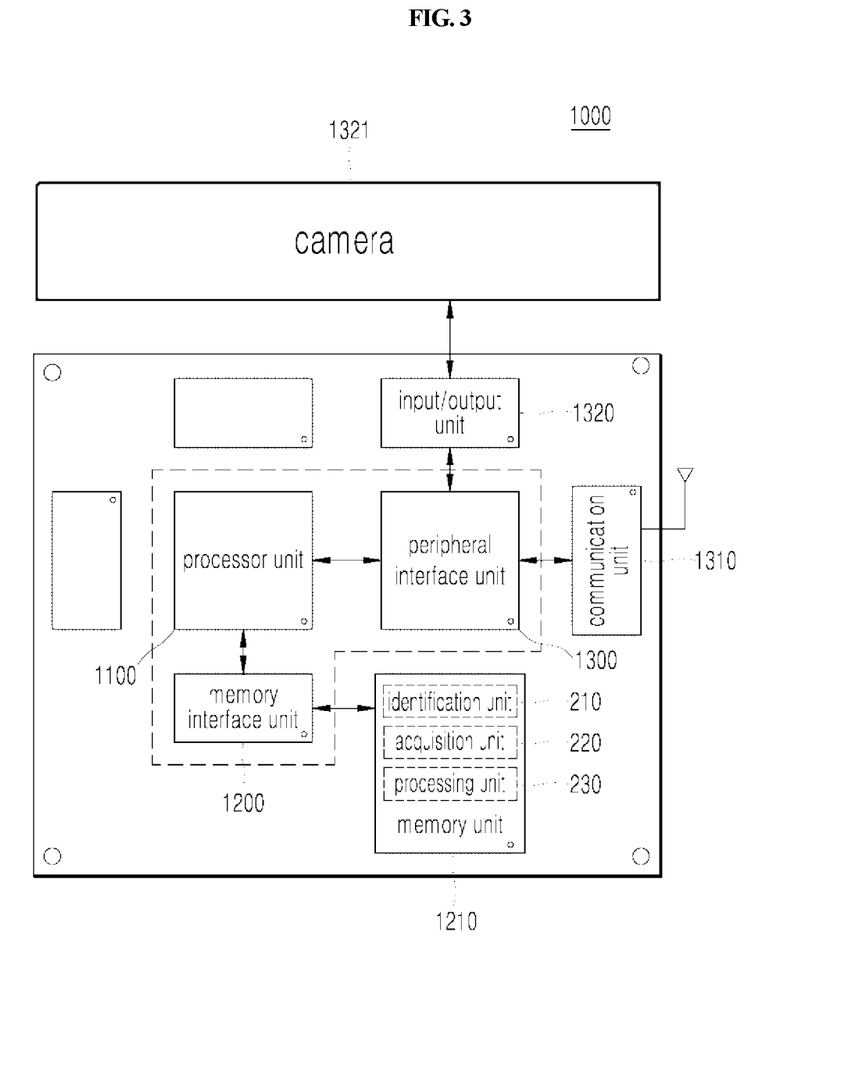
FIG. 3 illustrates an example schematic configuration of a hardware system to implement the photographing apparatus in FIG. 2.

FIG. 3 illustrates an example hardware system 1000 to implement the photographing apparatus in FIG. 2. In FIG. 3, the hardware system 1000 includes a processor unit 1100, a memory interface unit 1200, and a peripheral interface unit 1300. in some implementations, each component in the hardware system 1000 can be a separate component, be integrated into one or more integrated circuits, or coupled to a system such as a bus system.

In this example, the bus system is an abstraction representing any of one or more individual physical buses, communication lines/interfaces, and/or multi-drop or point-to-point connections buses that are coupled by appropriate bridges, adapters, and/or controllers.

The processor unit 1100 can run various software stored in the memory unit 1210 by communicating with the memory unit 1210 through the memory interface unit 1200 and perform various tasks in the hardware system.

In this example, the identification unit 210, the acquisition unit 220, and the processing unit 230, which are components of the photographing apparatus 200 described with reference to FIG. 2, may be software stored in the memory unit 1210. In addition, an operating system may be stored in the memory unit 1210.

The operating system, e.g., an embedded operating systems such as iOS, Android, Darwin, RTXC, LINUX, UNIX, OS X, WINDOWS, or VxWorks, includes various procedures, sets of commands, software components, and/or drivers that control and manage system operations. For example, the operating system can operate memory management, storage device control, power management, and the like. In addition, the operating system enables communication between hardware and software.

In some implementations, the memory unit 1210 may include a memory hierarchy including, but not limited to, a cache, a main memory, and a secondary memory. The memory hierarchy may be configured, for example, through any combination of RAM, e.g., SRAM, DRAM, or DDRAM, ROM, flash memory, and magnetic and/or optical storage devices, e.g., a disk drive, a magnetic tape, a compact disk (CD), and a digital video disc (DVD).

The peripheral interface unit 1300 enables communication between the processor unit 1100 and a peripheral device. The peripheral device provides various tasks to the computer system. In some implementations, the peripheral interface unit 1300 includes a communication unit 1310 and an input/output unit 1320.

In this implementation, the communication unit 1310 connects the processor unit 1100 to another device. For example, the communication unit 1310 includes an antenna system, an RF transceiver, one or more amplifiers, a tuner, one or more oscillators, a digital signal processor, a codec chipset, and memory, and may include a known circuit that performs these tasks. However, the elements of the communication unit 1310 is not limited to these examples and the communication unit 1310 can include any other suitable element to connect the processor unit 1100 to one or more devices.

Examples of communication protocols supported by the communication unit 1310 may include a Wireless Local Area Network (WLAN), Digital Living Network Alliance (DLNA), Wireless Broadband (WiBro), World Interoperability for Microwave Access (WiMAX), Global System for Mobile communication (GSM), Code Division Multiple Access (CDMA), Code Division Multiple Access 2000 (CDMA2000), Enhanced Voice-Data Optimized or Enhanced Voice-Only (EV-DO), Wideband CDMA (WCDMA), High-Speed Downlink Packet Access (HSDPA), High-Speed Uplink Packet Access (HSUPA), IEEE 802.16, Long-Term Evolution (LTE), Long-Term Evolution Advanced (LTE-A), Wireless Mobile Broadband Service (WMBS), Bluetooth, Radio Frequency Identification (RFID), Infrared Data Association (IrDA), Ultra-Wideband (UWB), ZigBee, Near Field Communication (NFC), Ultra Sound Communication (USC), Visible Light Communication (VLC), Wi-Fi, Wi-Fi Direct, or the like. Wired communication networks may include a wired LAN, a wired Wide Area Network (WAN), Power Line Communication (PLC), USB communication, Ethernet, serial communication, optical fiber/coaxial cables, or the like, but may include any protocol capable of providing an environment for communication with other devices, without being limited thereto.

In some implementations, the input/output unit 1320 can be a controller to control an I/O device linked with other hardware systems. In FIG. 3, the input/output unit 1320 can control the camera 1321 such that the camera 1321 can take a photo of the subject 100.

The processor unit 1100 runs each component of the photographing apparatus 200 stored as software in the memory unit 1210 such that the camera 1321 captures a photo of the subject 100 based on a short-range communication signal transmitted from the subject 100. The processor unit 1100 can receive the short-range communication signal from the subject 100 using the communication unit 1310, the input/output unit 1320, the memory interface unit 1200, or the peripheral interface unit 1300.

In this example, the identification unit 210, the acquisition unit 220, and the processing unit 230 of the photographing apparatus 200 can be implemented as software, be stored in the memory unit 1210, and be processed by the processor unit 1100.

The identification unit 210 identifies a short-range communication signal. In particular, the identification unit 210 identifies a short-range communication signal that is transmitted from the subject 100 in each set period and is received through the communication unit 1310, and transmits a result of identification to the acquisition unit 220.

In this example, the identification unit 210 may distinguish a short-range communication signal transmitted from the subject 100 from other short-range communication signals transmitted from other devices using a method of identifying identification information, e.g., a UUID, included in the short-range communication signal.

The acquisition unit 220 acquires photographing reference information. In particular, when a result of identifying a short-range communication signal is received from the identification unit 210, the acquisition unit 220 acquires photographing reference information for photographing the subject 100 from the identified short-range communication signal and transmits an acquired result to the processing unit 230.

The acquired photographing reference information may include the distance to the subject 100, which is identified from the RSSI of the short-range communication signal, and a state of motion of the subject 100, which is identified from an RSSI difference between neighboring periods.

In this example, the state of motion of the subject 100 may include the moving speed of the subject 100.

In some implementations, the moving speed of the subject 100 can be proportional to the RSSI difference between the neighboring periods.

For example, the RSSI difference between the neighboring periods means the degree of positional change of the subject 100 that approaches or moves away from the photographing apparatus 200 receiving the short-range communication signal. Thus, the moving speed of the subject 100 can be determined based on the degree of positional change.

The processing unit 230 processes photographing of the subject 100. In particular, when photographing reference information is received from the acquisition unit 220, the processing unit 230 processes photographing of the subject 100 by operating a camera 1321 through the input/output unit 1320 according to a focus value and a shutter speed, which are determined based on the photographing reference information.

In this example, the processing unit 230 may determine the focus value of the camera suitable for the distance to the subject 100 by referring to the distance to the subject 100 in the photographing reference information. The processing unit 230 may also determine the shutter speed of the camera based on the moving speed that is included in the state of motion of the subject 100 in the photographing reference information. The processing unit 230 processes photographing of the subject 100.

As described above, photographing of the subject is processed based on a focus value and a shutter speed that are determined using the RSSI of a short-range communication signal transmitted from the subject 100. This photographing technique improves the performance of AF by supporting a camera's AF module.

Figure 4:
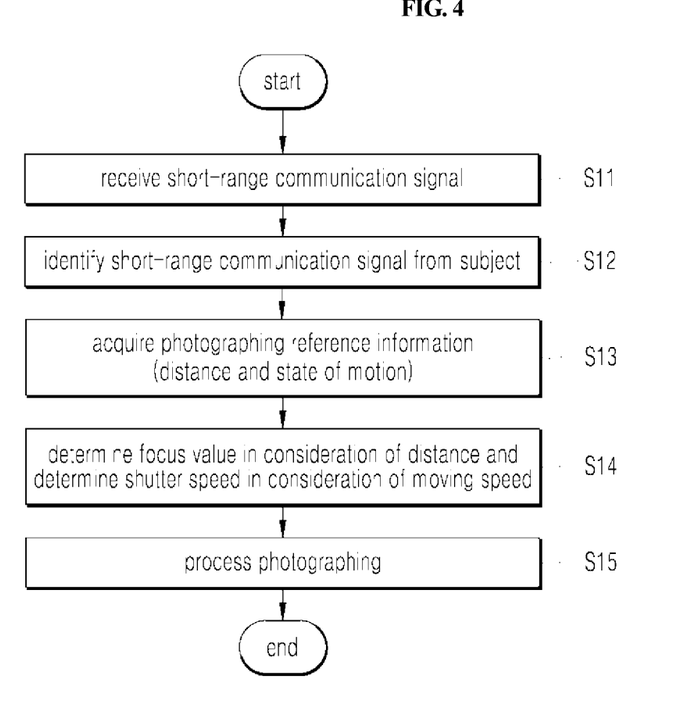
FIG. 4 is a flowchart of an example method for capturing a photo using the photographing apparatus in FIG. 2.

FIG. 4 is a flowchart of an example method for capturing a photo using a photographing apparatus. For example, the foregoing photographing apparatus described with reference to FIGS. 1 to 3 can be the photographing apparatus in FIG. 4.

An identification unit of the photographing apparatus identifies a short-range communication signal transmitted from a subject in each set period in operations S11 and S12.

In this example, the identification unit may distinguish a short-range communication signal transmitted from the subject from other short-range communication signals received from other devices using a method of identifying identification information, e.g., a UUID, included in the short-range communication signal.

When the short-range communication signal transmitted from the subject 100 is identified, an acquisition unit of the photographing apparatus acquires photographing reference information for photographing the subject from the identified short-range communication signal in operation S13.

The acquired photographing reference information may include the distance to the subject, which is identified from the RSSI of the short-range communication signal, and the state of motion of the subject, which is identified from an RSSI difference between neighboring periods. In this example, the state of motion of the subject may include the moving speed of the subject.

In some implementations, the moving speed of the subject can be proportional to the RSSI difference between the neighboring periods is greater.

For example, the RSSI difference between the neighboring periods means the degree of positional change of the subject that approaches or moves away from the photographing apparatus receiving the short-range communication signal. Thus, the moving speed of the subject can be determined based on the degree of positional change.

When the photographing reference information for photographing the subject is acquired from the short-range communication signal, the processing unit processes photographing of the subject by operating a camera based on a focus value and a shutter speed, which are determined based on the acquired photographing reference information in operations S14 and S15.

In this example, the processing unit may determine the focus value of the camera suitable for the distance to the subject based on the distance to the subject in the photographing reference information. The processing unit may determine the shutter speed of the camera based on the moving speed that is included in the state of motion of the subject in the photographing reference information. The processing unit processes photographing of the subject to generate a photo.

As described above, photographing of the subject is processed based on a focus value and a shutter speed that are determined using the RSSI of a short-range communication signal transmitted from the subject such that improves the performance of AF by supporting a camera's AF module.

Figure 5:
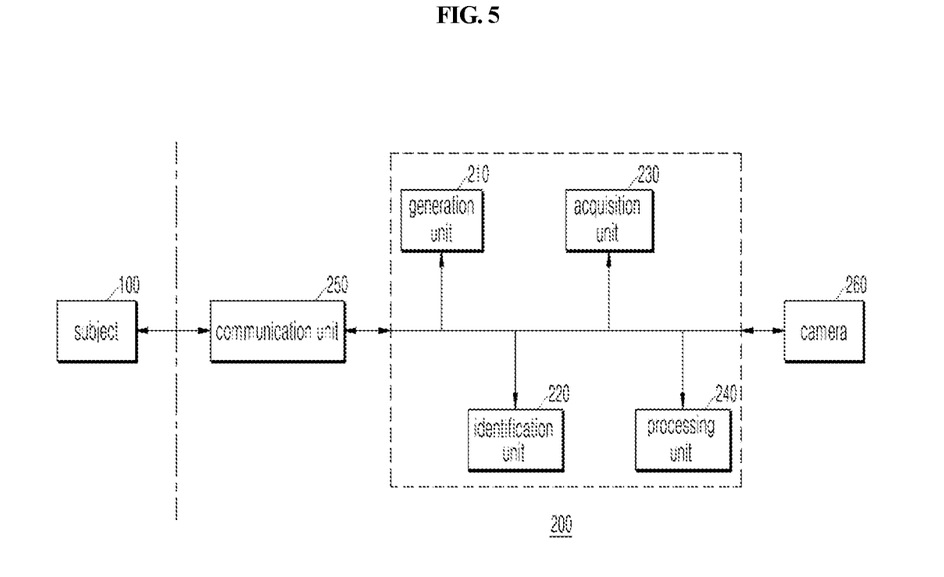
FIG. 5 illustrates another example schematic configuration of a photographing apparatus.

FIG. 5 illustrates another example photographing apparatus. As illustrated in FIG. 5, the photographing apparatus 200 includes a generation unit 210 to generate photographing criterion information, an identification unit 220 to identify a short-range communication signal, an acquisition unit 230 to acquire photographing reference information, and a processing unit 240 to process photographing.

All or at least some components of the photographing apparatus 200, including the generation unit 210, the identification unit 220, the acquisition unit 230, and the processing unit 240 according to the second exemplary implementation of the present specification, may be implemented in a software module or a hardware module run by a processor, or as a combination of a software module and a hardware module.

In this example, a software module may be understood as, for example, a command executed by a processor that performs an operation in the photographing apparatus 200, and the command may have the form of being stored in the memory of the photographing apparatus 200.

The photographing apparatus 200 according to the second exemplary implementation of the present specification may further include a communication unit 250 and a camera 260, in addition to the aforementioned components.

For example, configurations of the communication unit 250 and the camera 260 respectively correspond to configurations of a communication unit 1310 and a camera 1321, which will be described in greater detail with reference to FIG. 6.

The photographing apparatus 200 may process photographing of a subject 100 using a short-range communication signal transmitted from the subject 100. The photographing apparatus can include the generation unit 210, the identification unit 220, the acquisition unit 230, and the processing unit 240.

The generation unit 210 generates photographing criterion information. In particular, before processing actual photographing of the subject 100, the generation unit 210 performs advance photographing at an advance photographing time. The generation unit 210 processes the advance photographing using the processing unit 240. The generation unit 210 generates photographing criterion information that includes a focus value at the advance photographing time. The focus value is associated with a strength of the communication signal transmitted from the subject 100 at the advance photographing time.

Regarding the advance photographing, the processing unit 240 processes advance photographing of the subject 100 by operating the camera, acquires a focus value determined by the camera that has an AF capability, and transmits the focus value to the generation unit 210.

The identification unit 220 identifies a short-range communication signal. In particular, the identification unit 220 identifies a short-range communication signal transmitted from the subject 100 in each set period.

In this example, the identification unit 220 may distinguish a short-range communication signal transmitted from the subject 100 from other short-range communication signals received within a certain area through a method of identifying identification information, e.g., a UUID, included in the short-range communication signal.

The acquisition unit 230 acquires photographing reference information.

In particular, when a short-range communication signal transmitted from the subject 100 is identified, the acquisition unit 230 acquires photographing reference information for photographing the subject 100 from the identified short-range communication signal.

The acquired photographing reference information may include the RSSI of the short-range communication signal and a state of motion of the subject 100, which is identified from an RSSI difference between neighboring periods.

In this example, the state of motion of the subject 100 may include the moving speed of the subject 100. In some implementations, the moving speed of the subject 100 can be proportional to the RSSI difference between the neighboring periods.

For example, the RSSI difference between the neighboring periods may represent the degree of positional change of the subject 100 that approaches or moves away from the photographing apparatus 200 receiving the short-range communication signal. Thus, the moving speed of the subject 100 can be determined based on the degree of the positional change for a certain time period.

The processing unit 240 processes photographing of the subject 100.

In particular, when photographing reference information for photographing the subject 100 is acquired from a short-range communication signal, the processing unit 240 processes photographing of the subject 100 by operating the camera according to a focus value and a shutter speed, which are determined based on the acquired photographing reference information.

In this example, the processing unit 240 may identify a specific focus value, which is associated with the RSSI identified from the photographing reference information, from the photographing criterion information to determine the identified specific focus value as a focus value for photographing the subject 100, and may determine the shutter speed of the camera in consideration of the moving speed included as the state of motion of the subject 100 in the photographing reference information, thereby processing photographing of the subject 100.

In some implementations, the photographing apparatus 200 can be implemented as software. In some other implementations, the photographing apparatus 200 can be implemented as hardware. In some other implementations, the photographing apparatus 200 can be implemented as a combination of software and hardware. The software, the hardware, and the combination of the hardware can be implemented in a hardware system, e.g., a computer system.

Therefore, a hardware system for implementing the photographing apparatus 200 according to the second exemplary implementation of the present specification will be described below.

Figure 6:
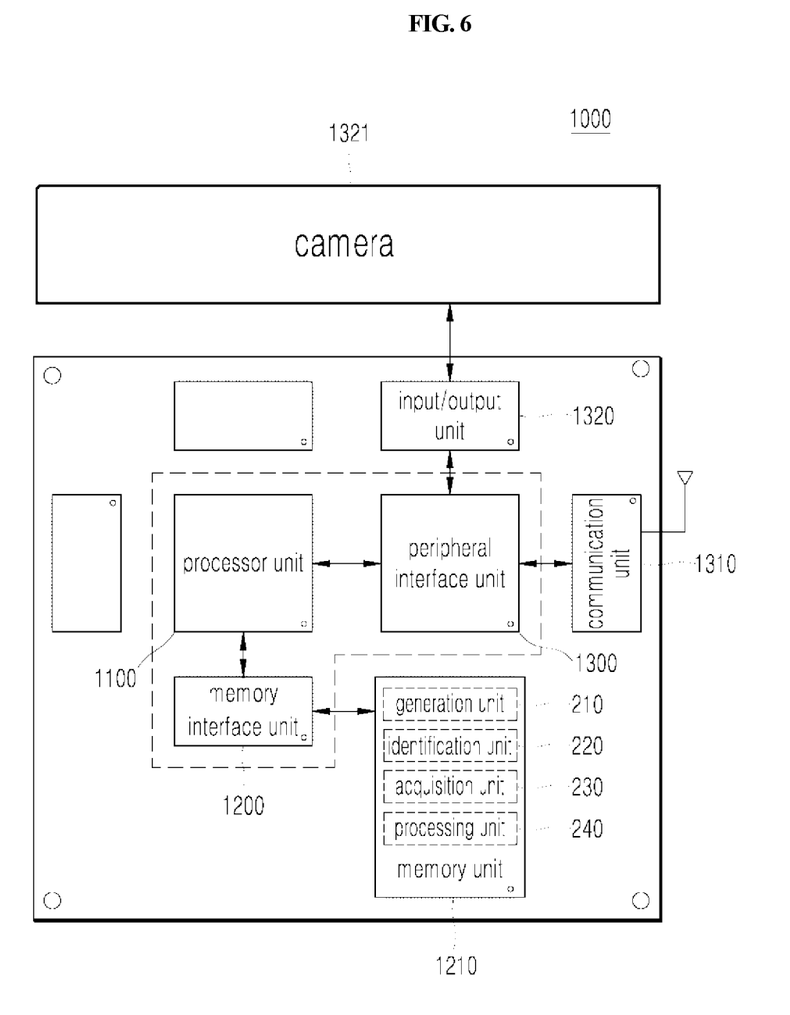
FIG. 6 illustrates an example schematic configuration of a hardware system used to implement the photographing apparatus in FIG. 5.

FIG. 6 illustrates an example schematic configuration of a hardware system 1000 used to implement the photographing apparatus in FIG. 5. Where components of the hardware system 1000 illustrated in FIG. 6 have the same configuration and the same designation as those of the hardware system 1000 described above with reference to FIG. 3, these components may be considered to be the same. Consequently, a specific example or description of corresponding components is omitted.

As illustrated in FIG. 6, the hardware system 1000 according to the second exemplary implementation of the present specification may include a processor unit 1100, a memory interface unit 1200, and a peripheral interface unit 1300.

The processor unit 1100 serves to run various software modules stored in the memory unit 1210 by communicating with the memory unit 1210 through the memory interface unit 1200 in order to perform various tasks in the hardware system.

In this example, the generation unit 210, the identification unit 220, the acquisition unit 230, and the processing unit 240, which are core components of the photographing apparatus 200 described with reference to FIG. 5, may be stored as software modules in the memory unit 1210. In addition, an operating system may be further stored in the memory unit 1210.

The peripheral interface unit 1300 serves to enable communication between the processor unit 1100 and a peripheral device.

The peripheral device is for providing different tasks to the computer system and may include, for example, a communication unit 1310 and an input/output unit 1320 in the second exemplary implementation of the present specification.

In this example, the input/output unit 1320 serves as a controller to control an I/O device linked with other hardware systems. In the second exemplary implementation of the present specification, the input/output unit 1320 may be responsible for controlling the camera 1321 in which photographing of the subject 100 is actually performed.

In some implementations, when run by the processor unit 1100, each component of the photographing apparatus 200 stored as a software module in the memory unit 1210 may process photographing of the subject 100 using a short-range communication signal transmitted from the subject 100 by communicating with the communication unit 1310 and the input/output unit 1320 via the memory interface unit 1100 and the peripheral interface unit 1300.

Hereinafter, each component in the hardware system 1000 for implementing the photographing apparatus 200 will be described in more detail.

For convenience of description, it is assumed that the generation unit 210, the identification unit 220, the acquisition unit 230, and the processing unit 240, which are components of the photographing apparatus 200 and are stored as software modules in the memory unit 1210, are run by the processor unit 1100.

The generation unit 210 generates generating photographing criterion information.

In particular, before processing actual photographing of the subject 100, the generation unit 210 performs advance photographing at an advance photographing time. The generation unit 210 processes the advance photographing using the processing unit 240. The generation unit 210 generates photographing criterion information that includes a focus value at the advance photographing time. The focus value is associated with the strength of the communication signal transmitted from the subject 100 at the advance photographing time. The generation unit 210 transmits the generated result to the processing unit 240.

Regarding such advance photographing, the processing unit 240 processes the advance photographing of the subject 100 by operating the camera 1321 using the input/output unit 1320. The processing unit 240 acquires a focus value determined by the camera 1321 that has an AF capability and transmits the focus value to the generation unit 210. For example, this focus value determined by the camera 1321 can be the focus value included in the photographing criterion information.

The identification unit 220 identifies a short-range communication signal. In particular, the identification unit 220 identifies a short-range communication signal that is transmitted from the subject 100 in each set period. The short-range communication signal can be received through the communication unit 1310. The short range communication signal can include the result of identification to the acquisition unit 230.

In this example, the identification unit 220 may distinguish a short-range communication signal transmitted from the subject 100 from other short-range communication signals received within a certain area using a method of identifying identification information, e.g., a UUID, included in the short-range communication signal.

The acquisition unit 230 obtains photographing reference information.

In particular, when a result of identifying a short-range communication signal is received from the identification unit 220, the acquisition unit 230 acquires photographing reference information for photographing the subject 100 from the identified short-range communication signal and transmits the acquired result to the processing unit 240.

The acquired photographing reference information may include the distance to the subject 100, which is identified from the RSSI of the short-range communication signal, and a state of motion of the subject 100, which is identified from an RSSI difference between neighboring periods.

In this example, the state of motion of the subject 100 may include the moving speed of the subject 100. In some implementations, the moving speed of the subject 100 can be proportional to the RSSI difference between the neighboring periods.

The processing unit 240 processes photographing of the subject 100. In particular, when photographing reference information is received from the acquisition unit 230, the processing unit 240 processes photographing of the subject 100 by operating a camera 1321 using the input/output unit 1320. The processing unit 240 processes the photographing of the subject 100 using the focus value and the shutter speed that are determined based on the photographing reference information.

In this example, the processing unit 240 may identify a specific focus value, from the photographing criterion information to determine the identified specific focus value as a focus value for photographing the subject 100. The specific focus value is associated with the RSSI identified from the photographing reference information as described above. The processing unit 240 may determine the shutter speed of the camera based on the moving speed that is included as the state of motion of the subject 100 in the photographing reference information. Then the processing unit 240 processes photographing of the subject 100 using the specific focus value and the shutter speed.

As described above, the photographing apparatus 200 and the hardware system 1000 process photographing of the subject based on the photographing criterion information, a focus value, and a shutter speed. In some implementations, the photographing criterion information can be determined based on the RSSI of a short-range communication signal transmitted from the subject 100. The focus value can be determined based on the photographing reference information. The shutter speed can be determined based on the moving speed of the subject 100. Thus, the photographing apparatus 200 and the hardware system 1000 can improve the performance of AF adjustment comparing to a conventional method, which only relies on an AF function of a camera.

Figure 7:
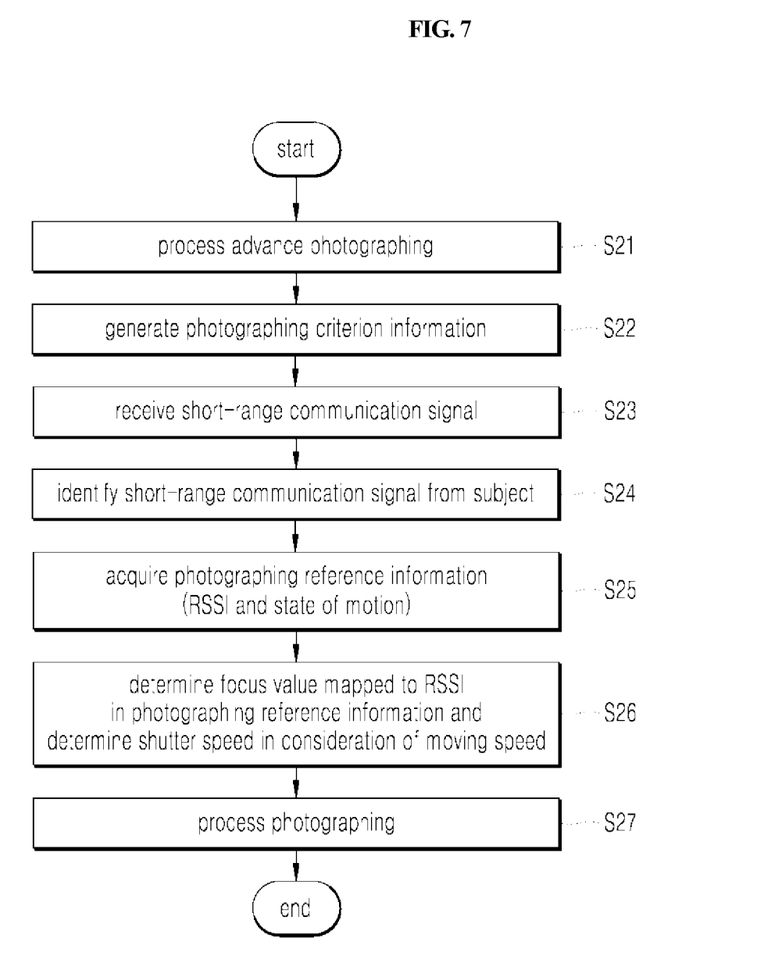
FIG. 7 is a flowchart of an example method for capturing a photo using the photographing apparatus in FIG. 5.

FIG. 7 is a flowchart of an example method for capturing a photo using the photographing apparatus in FIG. 5. In operations S21 and s22, which constitute a preliminary processing procedure before processing actual photographing of the subject 100, the generation unit 210 processes advance photographing using the processing unit 240. and the generation unit 210 generates photographing criterion information that includes a focus value at the advance photographing time. The focus value is associated with a strength of the communication signal transmitted from the subject 100 at the advance photographing time.

Regarding such advance photographing, the processing unit 240 processes advance photographing of the subject 100 by operating the camera, acquires a focus value determined by the camera that has an AF capacity, and transmits the focus value to the generation unit 210.

In operations S23 and S24, the identification unit 220 identifies a short-range communication signal transmitted from the subject 100 in each set period.

In this example, the identification unit 220 may distinguish a short-range communication signal transmitted from the subject 100 from among a plurality of short-range communication signals received within a certain area through a method of identifying identification information, e.g., a UUID, included in the short-range communication signal.

When a short-range communication signal transmitted from the subject 100 is identified, the acquisition unit 230 acquires photographing reference information for photographing the subject 100 from the identified short-range communication signal in operation S25.

The acquired photographing reference information may include the RSSI of the short-range communication signal and a state of motion of the subject 100, which is identified from an RSSI difference between neighboring periods.

In this example, the state of motion of the subject 100 may include the moving speed of the subject 100.

In some implementations, the moving speed of the subject 100 can be proportional to the RSSI difference between the neighboring periods.

For example, the RSSI difference between the neighboring periods represents the degree of positional change of the subject 100 that approaches or moves away from the photographing apparatus 200 receiving the short-range communication signal. Thus, the moving speed of the subject 100 can be determined based on the degree of positional change.

When photographing reference information for photographing the subject 100 is acquired from a short-range communication signal, the processing unit 240 processes photographing of the subject 100 by operating the camera 260 according to a focus value and a shutter speed, which are determined based on the acquired photographing reference information in operations S26 and S27.

In this example, the processing unit 240 may identify, from the photographing criterion information, the focus value described with reference to the operations S21 and S22. The focus value is associated with the strength of the communication signal transmitted from the subject 100 at the advance photographing time. The processing unit 240 also identifies an RSSI from the photographing reference information. The processing unit 240 adjusts the identified focus value based on the RSSI identified from the photographing reference information. The processing unit 240 uses the adjusted focus value as a focus value for photographing the subject 100. The processing unit 240 also determines the shutter speed of the camera based on the moving speed that is included as the state of motion of the subject 100 in the photographing reference information. Then, the processing unit 240 processes photographing of the subject 100 using the adjusted focus value and the shutter speed.

As described above, according to the operational flow in the photographing apparatus 200 according to the second exemplary implementation of the present specification, photographing of the subject may be processed according to photographing criterion information based on the RSSI of a short-range communication signal transmitted from the subject 100, a focus value determined using the photographing reference information, and a shutter speed determined based on the moving speed of the subject 100. Thus, the photographing apparatus 200 and the hardware system 1000 can improve the performance of the AF adjustment comparing to conventional method, which only relies on an AF function of a camera.

The implementations of the operations and subject matter described in the present specification may be realized by a digital electronic circuit, by the structure described in the present specification and the equivalent including computer software, firmware, or hardware including, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A computer-readable medium may be a machine-readable storage device, a machine-readable storage substrate, a memory device, a composition of materials influencing a machine-readable radio wave signal, or a combination of one or more thereof.

In the specification, the term "system" or "device", for example, covers a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) can be written in any form of programming language, including compiled or interpreted languages, declarative or procedural languages, and it can be deployed in any form, including as a stand-alone program or module, a component, subroutine, or another unit suitable for use in a computer environment. A computer program may, but need not, correspond to a file in a file system. A program can be stored in a single file provided to the requested program, in multiple coordinated files (for example, files that store one or more modules, sub-programs, or portions of code), or in a portion of a file that holds other programs or data (for example, one or more scripts stored in a markup language document). A computer program can be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

Implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations on the scope of any disclosure or of what may be claimed, but rather as descriptions of features that may be specific to particular implementations of particular disclosures. Certain features that are described in the specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In addition, in the specification, the operations are illustrated in a specific sequence in the drawings, but it should not be understood that the operations are performed in the shown specific sequence or that all shown operations are performed in order to obtain a preferable result. In a specific case, a multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present specification. Therefore, while the present specification was described in detail with reference to the above-mentioned examples, a person skilled in the art may modify, change and transform some parts without departing a scope of the present specification. The scope of the present specification is defined by the appended claims to be described later, rather than the detailed description. Accordingly, it will be appreciated that all modifications or variations derived from the meaning and scope of the appended claims and their equivalents are included in the range of the present specification.

What is claimed is:

1. A photographing apparatus comprising a processor and a memory storing one or more commands that, when executed by the processor, cause the processor to perform operations, the operations comprising:
   receiving a first communication signal and a second communication signal from a subject;
   identifying photographing reference information from the communication signal, the photographing reference information comprising a state of motion of the subject;
   identifying a first RSSI from the first communication signal and a second RSSI from the second communication signal;
   determining a time period between a first moment that the first communication signal is received and a second moment that the second communication signal is received;
   determining the state of motion based on the first RSSI, the second RSSI, and the time period; and
   based on the state of motion, controlling a shutter speed to capture a photo that includes the subject.

2. The photographing apparatus of claim 1, wherein the photographing reference information further comprises a distance between the photographing apparatus and the subject, wherein the distance is determined using a Received Signal Strength Indicator (RSSI) of the communication signal, and further comprising controlling a focus value based the distance determined using the RSSI to control a focus value to capture the photo.

3. The photographing apparatus of claim 1, wherein determining the state of motion includes:
   determining a moving speed of the subject based on the first RSSI, the second RSSI, and the time period.

4. The photographing apparatus of claim 3, wherein the moving speed of the subject is proportional to a difference between a value of the first RSSI and a value of the second RSSI.

5. The photographing apparatus of claim 2, wherein the operations further include:
   processing advance photographing of the subject at an advance photographing time; obtaining a particular focus value that is used to process the advance photographing of the subject at the advance photographing time; and
   generating photographing criterion information that includes the particular focus value.

6. The photographing apparatus of claim 5, wherein the operations further include:
   identifying, from the photographing criterion information, the particular focus value;
   adjusting the particular focus value based on the distance of the photographing reference information; and
   processing the photographing of the subject based on the adjusted focus value.

7. A method comprising:
   receiving a first communication signal and a second communication signal from a subject;
   identifying photographing reference information from the communication signal, the photographing reference information comprising a state of motion of the subject;
   identifying a first RSSI from the first communication signal and a second RSSI from the second communication signal;
   determining a time period between a first moment that the first communication signal is received and a second moment that the second communication signal is received;
   determining the state of motion based on the first RSSI, the second RSSI, and the time period; and
   based on the state of motion, controlling a shutter speed to capture a photo that includes the subject.

8. The method of claim 7, wherein the photographing reference information further comprises a distance between the photographing apparatus and the subject, wherein the distance is determined using a Received Signal Strength Indicator (RSSI) of the communication signal, and further comprising controlling a focus value based the distance determined using the RSSI to control a focus value to capture the photo.

9. The method of claim 7, wherein determining the state of motion includes:
   determining a moving speed of the subject based on the first RSSI, the second RSSI, and the time period.

10. The method of claim 9, wherein the moving speed of the subject is proportional to a difference between a value of the first RSSI and a value of the second RSSI.

11. The method of claim 8, further comprising:
    processing advance photographing of the subject at an advance photographing time; obtaining a particular focus value that is used to process the advance photographing of the subject at the advance photographing time; and
    generating photographing criterion information that includes the particular focus value.

12. The method of claim 11, further comprising:
    identifying, from the photographing criterion information, the particular focus value;
    adjusting the particular focus value based on the distance of the photographing reference information; and
    processing the photographing of the subject based on the adjusted focus value.

13. A non-transitory computer-readable storage media encoded with instructions, when executed by a processor, cause the processor to:
    receive a first communication signal and a second communication signal from a subject;
    identify photographing reference information from the communication signal, the photographing reference information comprising a state of motion of the subject;
    identify a first RSSI from the first communication signal and a second RSSI from the second communication signal;

determine a time period between a first moment that the first communication signal is received and a second moment that the second communication signal is received;

determine the state of motion based on the first RSSI, the second RSSI, and the time period; and based on the state of motion control a shutter speed to capture a photo that includes the subject.

14. The computer-readable storage media of claim 13, wherein the photographing reference information further comprises a distance between the photographing apparatus and the subject, wherein the distance is determined using a Received Signal Strength Indicator (RSSI) of the communication signal, and further comprising controlling a focus value based the distance determined using the RSSI to control a focus value to capture the photo.

15. The computer-readable storage media of claim 13, wherein instructions for determining the state of motion causes the processor to:

determine a moving speed of the subject based on the first RSSI, the second RSSI, and the time period, and wherein the moving speed of the subject is proportional to a difference between a value of the first RSSI and a value of the second RSSI.

16. The computer-readable storage media of claim 14, further storing instructions that cause the processor to:

process advance photographing of the subject at an advance photographing time; obtaining a particular focus value that is used to process the advance photographing of the subject at the advance photographing time; and generate photographing criterion information that includes the particular focus value.

17. The computer-readable storage media of claim 16, further storing instructions that cause the processor to:

identify, from the photographing criterion information, the particular focus value;

adjust the particular focus value based on the distance of the photographing reference information; and process the photographing of the subject based on the adjusted focus value.

* * * * *